(12) United States Patent
Ruizenaar

(10) Patent No.: US 11,122,770 B2
(45) Date of Patent: Sep. 21, 2021

(54) AUTOMATIC FEED COMPOSING DEVICE

(71) Applicant: LELY PATENT N.V., Maassluis (NL)

(72) Inventor: Ruud Ruizenaar, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 478 days.

(21) Appl. No.: 15/754,051

(22) PCT Filed: Jul. 28, 2016

(86) PCT No.: PCT/NL2016/050558
§ 371 (c)(1),
(2) Date: Feb. 21, 2018

(87) PCT Pub. No.: WO2017/034397
PCT Pub. Date: Mar. 2, 2017

(65) Prior Publication Data
US 2018/0271053 A1   Sep. 27, 2018

(30) Foreign Application Priority Data

Aug. 27, 2015   (NL) ...................... 2015355

(51) Int. Cl.
*A01K 5/00* (2006.01)
*A01K 5/02* (2006.01)

(52) U.S. Cl.
CPC ............ *A01K 5/001* (2013.01); *A01K 5/00* (2013.01); *A01K 5/02* (2013.01); *A01K 5/0208* (2013.01); *A01K 5/0266* (2013.01); *A01K 5/0275* (2013.01)

(58) Field of Classification Search
CPC . A01K 5/001; A01K 5/00; A01K 5/02; A01K 5/0266; A01K 5/0208; A01K 5/0275; A01F 29/06

(Continued)

(56) References Cited

U.S. PATENT DOCUMENTS

| | | | | |
|---|---|---|---|---|
| 5,008,821 A | * | 4/1991 | Pratt | A01K 5/02 119/51.01 |
| 5,309,864 A | * | 5/1994 | Harmsen | A01K 5/0266 119/51.02 |

(Continued)

FOREIGN PATENT DOCUMENTS

| | | | |
|---|---|---|---|
| EP | 2 795 417 A1 | 10/2014 | |
| WO | WO 2015/065172 A1 | 5/2015 | |
| WO | WO-2018038603 A1 * | 3/2018 | ........... A01K 5/0266 |

OTHER PUBLICATIONS

International Search Report dated Dec. 6, 2016, in PCT/NL2016/050558 filed Jul. 28, 2016.

*Primary Examiner* — Charles Cooley
(74) *Attorney, Agent, or Firm* — Oblon, McClelland, Maier & Neustadt, L.L.P.

(57) ABSTRACT

An automatic and autonomous feeding device comprising a feed kitchen having different feed varieties and a feed fetching device, and a control system for executing a feed composing cycle including receipt or generation of a feed order and controlling of the feed fetching device to fetch feed from the feed kitchen according to the feed order in order to compose a feed mixture, and comprising a feed determining device configured to deteiiiiine quantity information of the feed varieties, wherein the control device further contains fall-back information, for at least one feed variety, which fall-back information specifies what action the feeding device, during and/or after execution of a feed composing cycle, needs to perform if the feed determining device determines that that quantity of this feed variety which is desired in the feed order is greater than the available quantity.

13 Claims, 2 Drawing Sheets

(58) Field of Classification Search
USPC ....... 366/302, 306, 307, 314, 318–324, 603, 366/141; 241/101.76, 101.761, 101.8, 241/260.1, 605; 700/213; 701/50; 119/51.01, 51.02
See application file for complete search history.

(56) References Cited

U.S. PATENT DOCUMENTS

| | | | |
|---|---|---|---|
| 5,424,957 A * | 6/1995 | Kerkhoff | A01K 5/02 700/240 |
| 5,457,627 A * | 10/1995 | Cureton | A01K 5/02 705/34 |
| 5,636,118 A | 6/1997 | Brewster et al. | |
| 5,867,820 A | 2/1999 | Cureton et al. | |
| 5,878,402 A | 3/1999 | Brewster et al. | |
| 8,397,673 B2 * | 3/2013 | Van Lier | A01K 5/02 119/51.02 |
| 9,522,811 B2 * | 12/2016 | Van Kuilenburg | A01K 5/0266 |
| 10,136,616 B2 * | 11/2018 | Van Den Berg | A01K 5/004 |
| 10,674,675 B2 * | 6/2020 | Liet | A01F 29/10 |
| 10,743,519 B2 * | 8/2020 | Ruizenaar | A01K 5/02 |
| 10,791,707 B2 * | 10/2020 | Van Den Berg | A01K 5/001 |
| 10,905,099 B2 * | 2/2021 | Van Houten | A01K 5/02 |
| 2010/0017035 A1 * | 1/2010 | Van Den Berg | A01K 1/01 700/259 |
| 2010/0126423 A1 * | 5/2010 | Van Den Berg | A01K 5/0266 119/57.92 |
| 2011/0261641 A1 * | 10/2011 | Barbi | A23N 17/007 366/141 |
| 2015/0230427 A1 * | 8/2015 | Wisse | A01K 5/02 701/2 |
| 2016/0249585 A1 * | 9/2016 | Van Den Berg | A01K 5/0275 119/51.02 |
| 2017/0055494 A1 * | 3/2017 | Ruizenaar | A01K 5/02 |
| 2017/0156287 A1 * | 6/2017 | Ruizenaar | A01K 5/02 |
| 2018/0177151 A1 * | 6/2018 | Van Houten | A01K 5/02 |
| 2018/0271053 A1 * | 9/2018 | Ruizenaar | A01K 5/00 |

* cited by examiner

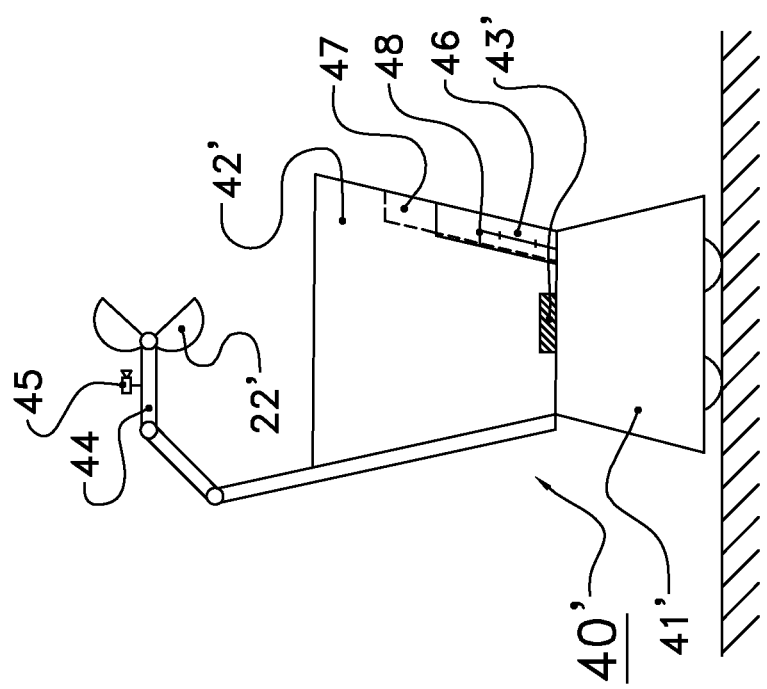

AUTOMATIC FEED COMPOSING DEVICE

BACKGROUND

1. Field

The invention relates to an automatic and autonomous feeding device comprising a feed kitchen, particularly useful in feeding animals.

More particularly, the invention relates to an automatic and autonomous feeding device comprising a feed kitchen having a plurality of storage places for different feed varieties and a feed fetching device for fetching feed from the feed kitchen and delivering the feed at a feed delivery site, and a control system for repeatedly executing a feed composing cycle comprising receipt or generation of a feed order and controlling of the feed fetching device to fetch one or more feed varieties from the feed kitchen according to the feed order in order to compose a feed mixture at the feed delivery site, wherein the feed order comprises a list of desired feed varieties and respective quantities to be brought together at the feed delivery site in order to form the feed mixture, and comprising feed determining means configured to determine quantity information of at least one, and preferably each, feed variety fetched for the feed order.

2. Description of the Related Art

Feed devices of this type are known per se. Thus there are various suppliers of automatic feeding systems which operate on this basis, for example the Trioliet Triomatic system or the Lely Vector® system. In these, an automatic feeding device fetches with a feed fetching device, such as, for example, a feed grab or the like, one or more feed varieties from a feed kitchen in order to bring these together according to a recipe or feed order as a feed mixture to be fed to animals. A feed kitchen herein comprises any store of feed of a plurality of varieties which is accessible for an automatic feeding device.

In practice, it happens that a feed kitchen is not replenished in time, so that a feed variety runs out. This results in an order not being able to be made, or, possibly, completed, which often leads to stoppage of the feeding device and the raising of an alarm signal to an operator, who must immediately take action to restore operation of the feeding device. This often unnecessarily ensures an enlargement of the work schedule of the operator, which, specifically for an autonomous and automatic feeding device, is undesirable.

Summary

It is hence an object of the invention to improve the feeding device of the kind named in the introduction such that this number of breakdown situations decreases and the feeding device can remain effectively in operation for a greater part of the time.

The invention achieves this object in particular with an automatic and autonomous feeding device comprising a feed kitchen having a plurality of storage places for different feed varieties and a feed fetching device for fetching feed from the feed kitchen and delivering the feed at a feed delivery site, and a control system for repeatedly executing a feed composing cycle comprising receipt or generation of a feed order and controlling of the feed fetching device to fetch one or more feed varieties from the feed kitchen according to the feed order in order to compose a feed mixture at the feed delivery site, wherein the feed order comprises a list of desired feed varieties and respective quantities to be brought together at the feed delivery site in order to form the feed mixture, and comprising feed determining means configured to determine quantity information of at least one, and preferably each, feed variety fetched for the feed order, wherein the control device further contains fall-back information, previously entered by a user, for at least one feed variety, which fall-back information specifies what action the feeding device should perform, during and/or after execution of a feed composing cycle, if the feed determining means determine that that quantity of this at least one feed variety which is desired in the feed order is greater than the quantity available according to the quantity information, wherein the control system is programmed such that, for the at least one feed variety, the following fall-back information is available for the user for input into the control device: a) stopping composing the feed mixture and generation of an alarm signal to the user; b) continuing composing the feed mixture, therein replacing the feed variety by at least one alternative feed variety to be entered by the user, as well as generation of either b1) an alarm signal to the user, or b2) a report message callable by the user: c) continuing composing the feed mixture, therein omitting the feed variety from the feed order, and generation of a report message callable by the user, or in particular an alarm signal to the user.

With a feeding device of this type, it is possible, in more cases than usual, to continue to mix feed, as well as to limit the number of alarm signals, which, after all, in principle demand immediate action, and partly to replace these by callable report messages, which per se also require action, albeit no immediate action. The freedom to continue with the composition is herein achieved, for example, by virtue of the fact that, for one or more feed varieties, one or more alternative feed varieties have been entered in the control system. Should the feed determining means establish during use that a feed variety is running out, then the control system can switch over to the (or an) alternative feed variety and still complete the feed order. Advantageously, fall-back information is provided for each feed variety. After all, in many cases it will (have to) be a default value to stop, if the feed determining means establish that there is, or is a threat of, a shortage in a specific feed variety, but no fall-back information has been entered. If, for a feed variety, a plurality of alternative feed varieties are stated, then there are, of course, more possibilities of continuing with composition of the feed mixture. In this case, the control system can be configured to observe a predetermined order of preference, or else an arbitrarily determined order, or an order based on the respective stocks which are available.

Of course, it is possible that also the (or each) alternative feed variety runs out. If this variety is regarded as essential, the feeding device will still have to stop composing the feed mixture. If, however, the original feed variety is not regarded as essential, and the user has entered, for example, option c), that is to say continuation of the feed mixture, but omitting the non-essential feed variety, then the feeding device thus does not stop the composition, albeit in amended form. This applies, for example, to a feed variety which is only added in order to make the feed mixture more attractive to the animals. It is also possible that the feed variety stated in the feed order is not so much essential, as that at least a comparable variety must be available, or an alternative feed variety must be stated. For example, roughage such as (fresh) grass or hay is regarded as essential in the diet of dairy animals. If there is no fresh grass available, but instead an entered alternative such as straw, then although that is not the optimal ingredient for the feed mixture, it is not necessary to stop the composition. It is then sufficient to replace the feed variety and to generate a callable report message. The user will periodically call up a status of the feeding device, whereupon the generated report message can be examined, after which corrective action can be taken. Only in the event that there is no alternative (any longer) available will the feeding device generate an alarm signal, because for that feed mixture immediate action is required. The composition of the feed mixture will then stop until this action, the replenishment of the feed variety, has been executed.

It is here noted that the stoppage of the composition of the feed mixture does not have to involve an absolute stoppage of the feeding device. This will be explained in greater detail later on in the description. At the same time, it is here noted that by "the control system is configured" is meant that the control system is programmed, or is provided with appropriate physical "hard" circuits, to perform the task which is hereinafter described.

By "feed delivery site" is meant a site or region where feed is delivered for the purpose of composing the feed mixture. This could be a single position, wherein the feed collecting device thus delivers all the feed collected from the feed kitchen at the same position. An example hereof is a stationary feed mixing cart, or a conveyor belt. It is also possible, however, that the feed delivery site has a three-dimensional extent. Thus the feed delivery site also comprises a feed mixing cart, but then one which is moved from, for example, feed variety to feed variety. An example hereof is a self-propelling and self-loading feed mixing cart. The control device, which directly or indirectly controls the feed mixing cart, in this case ultimately determines the loading. A collection hopper which is moved along a rail or the like from feed variety to feed variety is also described by the term "feed delivery site". Furthermore, it is also the case that the feed fetching device can be not only a device which is separate from the feed delivery site, and possibly from a separate feed collection hopper, but also a device which is provided at the feed delivery site, or even on the feed collection hopper. All this will be explained in greater detail later.

In the feeding device according to the invention, the feed determining means determine the quantity information of at least one, and preferably each, feed variety fetched for the feed order. In this case, the feed determining means can be variously designed. Thus the feed determining means can simply comprise a memory or register in the control system, in which the respective quantity of the or each feed variety is kept. This can work well if the feed varieties can be fetched in countable portions from the feed kitchen, such as "2 bales of straw", or "3 grabs of maize". Stock keeping on the basis of the quantities consumed in the already completed feed orders (thus: numbers) of the feed varieties is then sufficient to determine for a following feed order whether there is no longer enough of one or more feed varieties.

In other embodiments, the feed determining means comprise a weighing means, configured to determine a weight of feed fetched from the feed kitchen by the feed fetching device. The weighing means, such as a spring balance, strain gauges or load cells, can be provided at any site suitable for the purpose, such as on the feed fetching device, whereby each fetched quantity of a feed variety can be weighed, or at a feed delivery site, so that, for example, from a new total weight of the feed mixture delivered at the feed delivery site, the quantity information for each feed variety can be determined. Once again, a memory or the like is advantageously provided in the control system in order to keep stock of respective stocks of the feed varieties. It is also possible to use other feed determining means, such as volume determining means or metering means. These can be useful if the feed variety is fluid or has a low density, so that weighing is more laborious or less accurate. An example relates to feed varieties which can be administered as a liquid, such as glycerol or some minerals (in solution).

Particular embodiments are indicated in the now following part of the introduction of the description.

In some embodiments, the control system is configured to update the fall-back information for a feed variety from b) to a) if the available quantity of the or each alternative feed variety for this feed variety is less than or is equal to the desired quantity of this alternative feed variety. This prevents, in the case of two exchangeable feed varieties A and B, an endless loop of "replace feed variety A by a feed variety B" +"replace B by A". Furthermore, the control system, if the alternative feed variety (varieties) is (are) also exhausted, will have to adapt thereto, and still raise an alarm and stop composition of the feed mixture.

In some embodiments, the control system is configured to replace in a feed order a replaceable quantity of feed variety by an equal quantity of the alternative feed variety (varieties). This is a simple version of composition with an alternative. The control system can in this case be configured to decide, on the basis of the available stock information, not to load any of a requested feed variety, but to directly replace it by a stated alternative feed variety. This limits the number of actions for the feed composition, which can be favorable for production and efficiency. It is also possible for the control device to be configured to switch over to the alternative feed variety (varieties) if the feed determining means, during the collection of the feed variety from the feed kitchen, establish that there is an insufficient quantity available. If a quantity of the feed variety has then already been added to the feed mixture, then the control device can be configured to determine a remaining quantity of the feed variety, which in itself is customary, since also necessary, in the composition process should the feed variety still be sufficiently available. In this simple case, the control device is configured to take the remaining quantity of the alternative variety (varieties) then on a one-to-one basis.

In some embodiments, the control system is configured to replace in a feed order a replaceable quantity of feed variety by a quantity of the alternative feed variety (varieties), which quantity is a predetermined function of that quantity of feed variety which is to be replaced. In this alternative version, the control device comprises, or is operatively connected to, a memory containing, for at least a combination of feed variety and alternative feed variety, the associated function. In many cases, the alternative feed variety will be a poorer feed variety, that is to say that often more of the alternative feed variety is necessary. Thus it will often happen that, for example, 10%, or 20% or the like more of an alternative feed variety is necessary, or, albeit less often, a smaller quantity, such as 80%. The function is then, for example, "multiplied by 1.1", or by 1.2, or by 0.8 or the like respectively. Of course, the number can be chosen according to desire or necessity, for example in dependence on a content of a relevant substance in the respective feed varieties, such as proteins or NDF. A precondition is then that the feed site or the feed collection hopper can cope with this new quantity. Where the new quantity ensures that a maximum loadable quantity of feed mixture would be exceeded now that more of an alternative feed variety must be loaded, it can be chosen to dump the hitherto loaded partial feed mixture temporarily elsewhere, and then, for example to grab it in parts, which can each, in their own right, be optimally replenished. It can also be chosen to accept for the momentary feed mixture a possible shortage in the feed mixture, which shortage could arise from too little of the alternative variety being loaded, and to correct this in a following feed mixture for the group of animals. To accept and correct this is often reasonably feasible in the case of roughage varieties, and less so for minerals, concentrates and the like. Yet it is precisely of these last varieties that a relatively small quantity is often necessary, so that an overload will not rapidly arise.

It is here noted that the replacement of one feed variety by another can have still more positive results than the reduction in the downtime of the feeding device. For it can happen that originally two groups of animals each get a different ration or feed mixture. These rations need, of course, to be composed separately. If, however, one or more feed varieties have run out, it may be that the feed mixtures, as a result of the change(s) made in one or more of the feed mixtures on the basis of the fall-back information, have become equal to one another. This means that the associated groups of animals can be formed into 1 large group, which all get the same ration. The composition of the ration and the feeding thereof to the now larger group of animals can in principle be realized with greater efficiency.

In some embodiments, the feeding device further comprises a feed mixture collection hopper, which is configured to receive therein, at the feed delivery site, the feed mixture to be composed, and a feed delivery device for delivering feed from the feed mixture collection hopper. A feed mixture collection hopper is hence favorable because it is in most cases desirable to mix the feed mixture, so that the animals to which it is fed could not simply fish out of it the constituent parts, but rather the feed must be eaten as one whole. To this end, the feed mixture collection hopper generally comprises an auger or other mixing device, such as is known per se. In particular, the feed delivery device comprises a delivery opening closable with a movable flap, and more particularly a motorized rotatable discharge roller configured to deliver feed, by revolution, via the delivery opening. These serve to be able to deliver in a controlled manner the feed present in the hopper, once again as known per se in the prior art. Alternatively, the feed delivery site can, however, usually comprise a spot on the floor, or a conveyor belt, or some other desired device on which or in which the feed mixture can be collected.

In some embodiments, the feeding device comprises a storage site for temporary storage of a feed mixture not yet fully composed according to the associated order. This could usefully be used, for example, if there is a fault in the feeding device, for example on a feed collection hopper, which then needs to be emptied, and then preferably at the storage site. Following rectification of the fault, the feed mixture can be taken up in order to be completed. Note that the storage site does not have to be equal to the feed delivery site, which, after all, also comprises a spot where the feed mixture is gathered and thus is temporarily stored. It is clear, however, that the feed delivery site is relieved of the completed mixture, while the here mentioned storage site will in principle never contain a completed feed mixture, because that will then be able to be fed and does not have to be stored.

In particular, the control system is configured to execute a replacement action if the control system establishes that the feed mixture to be composed is not composable according to the associated feed order and the respective available quantities and fall-back information. As already indicated above, it is not necessary for the feeding device to cease all activity if the control system establishes, on the basis of the specific quantity/quantities of the feed variety (varieties), that the momentary feed mixture is not composable. It is possible to perform an alternative action, a replacement action. As a result, the capacity of the feeding device will be able to increase. There now follow some examples hereof.

For example, the replacement action comprises the delivery of the feed mixture, in particular from the feed collection hopper, to the storage site, as well as the commencement of composition of a new feed mixture on the basis of a following feed order. Here the control device is thus configured to deliver to the storage site the still uncompleted feed mixture which is already present at the feed delivery site or a feed collection hopper, in order thereby to make room for another feed mixture, and also in order to proceed to compose that other feed mixture. After all, it is certainly often possible to keep a group of animals which would have to be fed with the now still uncompleted feed mixture waiting for a while, but to already instead compose another feed mixture in order therewith to feed another group of animals. In the event of a shortage of a feed variety, the feeding device can thus still be used. Certainly in the case of a fault which has meanwhile been resolved by a user, such as a replenished feed quantity, the feeding device in principle does not then stand idle. Such a case can in practice occur if a group of animals requires an essential feed variety, such as glycerol for high-yielding cows, but another group only requires a mixture whose constituent feed varieties are still available, such as dry or low-yielding cows. In such a case, a running order for the composition of feed mixtures can be changed. To this end, there is no need, moreover, to commence the composition so as subsequently to store the partially composed mixture at the storage site. It is alternatively possible that the control system decides on the basis of the stock data to make another mixture, so that nothing needs to be stored at the storage site.

In some embodiments, the control system is configured to take up, in particular in the feed collection hopper, the feed mixture delivered to the storage site, and to replenish that feed mixture, according to a new feed order, with at least one quantity of a feed variety. In this embodiment, the control system is configured to arrange for the feed mixture stored at the storage site to be received by the collecting device, and to replenish this with one or more other feed varieties and/or quantities to form a new, different or not, feed mixture. This can be favorable in the event, for example, that a feed variety replenishment action by a user is too long delayed, and a group of animals which could not get the ideal feed mixture would then remain too long without feed. In such a case, it is possible to offer, alternatively to a basic feed mixture in which an alternative feed variety might be used, a substantially different feed mixture. To this end, the feeding device can use the stored feed mixture as the basic mixture.

In some embodiments, the replacement action comprises the composition at the feed delivery site, in particular in the feed collection hopper, of a new feed mixture on the basis of a new feed order and on the basis of the feed mixture present at the feed delivery site. In this embodiment, the control system is thus configured to take direct action, thus without first delivering the not yet completed feed mixture to a storage site. Rather, a direct switchover is made to an alternative feed mixture, for example for another group of animals. In practice, this is not always possible, because, for example, the feed mixture is already in very large part ready, and it would thus be inefficient to totally modify this mixture. Nevertheless, it increases the number of options, and thus it reduces the period for which the feeding device would be out of use.

The invention also relates to a control system of a feeding device according to the present invention. A control system of this type can comprise, for example, a computer which is programmed to give the automatic feeding device according to the invention the described characteristics.

BRIEF DESCRIPTION OF THE DRAWINGS

The invention will now be described in greater detail on the basis of a non-limiting illustrative embodiment, as well as the drawing and description thereof, in which:

FIG. 2 shows a feed collection device for use in the invention, in schematic view; and FIG. 3 shows a table of fall-back information.

FIG. 1 shows in schematic view a feeding device 1 according to the invention. The feeding device 1 comprises a control system having an antenna 11, as well as a feed collecting device 20 having a weighing device 23 and a feed fetching device that includes a crane framework 21 and a grab bucket 22 The feed collection device 20 also has a feed kitchen 30 containing feed varieties 31-1, 31-2, 31-3, .... Also shown is a feed delivery site 32, with, standing thereon, a feed mixing cart 40 having an underframe 41, a feed collection hopper 42 and a weighing device 43. A conveyor belt is indicated with 48 and a second feed mixing cart is indicated with 40".

Figure 1:
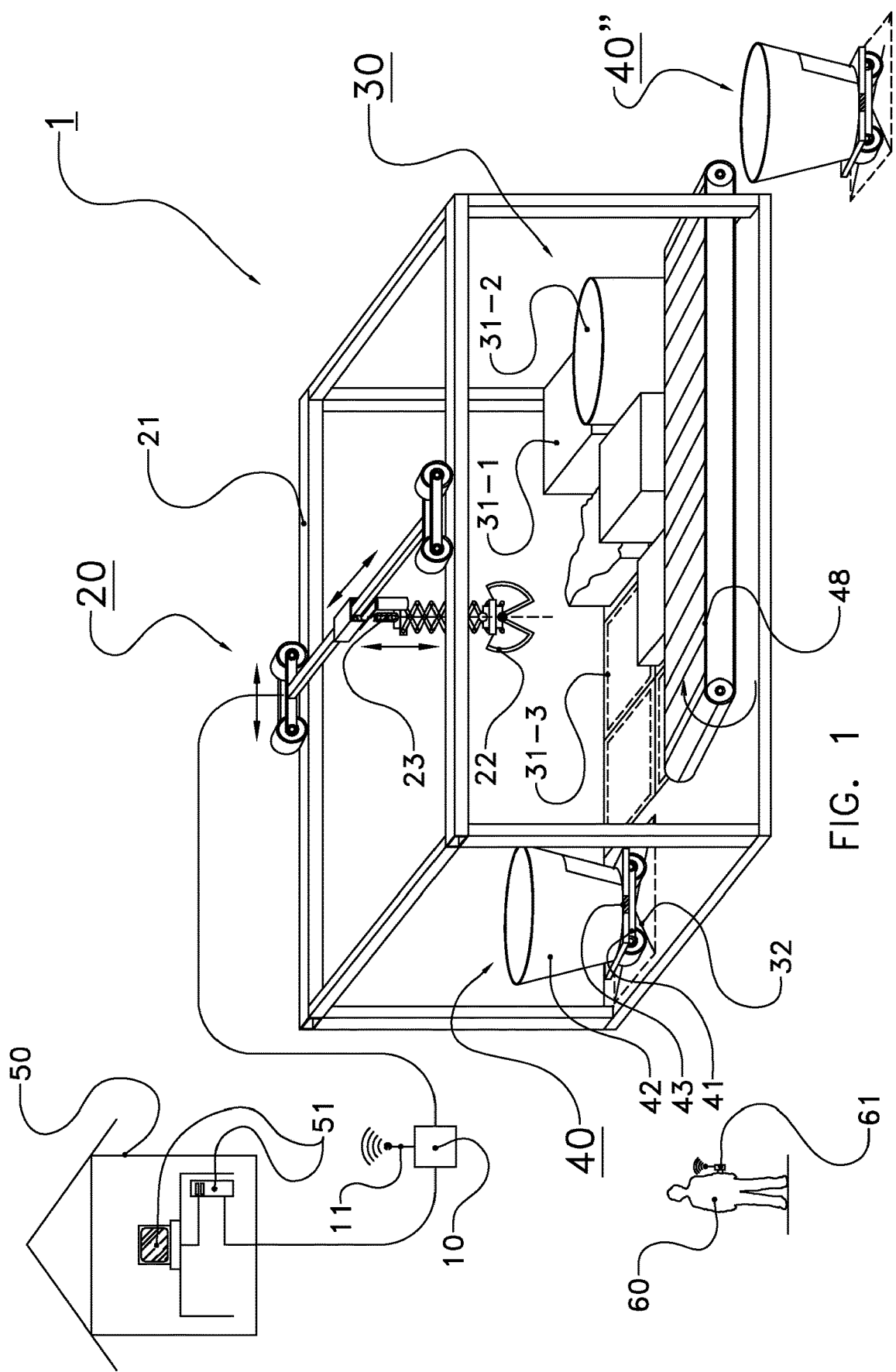
FIG. 1 shows schematically a view of a feeding device according to the invention.

With 50 is schematically indicated an office containing a computer 51. Furthermore, a farmer 60 has a mobile telephone 61 in his hand.

The feeding device 1 makes use of a feed kitchen 30 containing different feed varieties 31-1, etc. In the figure there is shown one feed variety (31-3) which is exhausted. All other varieties can be taken up with the grab bucket 22 and deposited in a feed collection hopper 42 of a feed mixing cart 40. With the weighing device 23 attached to the grab bucket 22, and/or with the weighing device 43 of the feed mixing cart 40, a quantity value of the received feed variety can be determined in order thus to meet a desired quantity of the feed order.

The desired quantities form part of a feed order or recipe . A feed order of this type can be composed with the aid of the feeding device 1, so as subsequently to be fed to a group of animals, such as dairy cows. To this end, the control system 10 contains or generates, for one or more different groups of animals, one or more associated feed orders. If so desired, these feed orders can be generated or monitored in a computer 51 in an office 50. The illustrated connection of the control system 10 to the computer 51, as well as to the thereby controllable feed collecting device 20, can both be a physical cabling and a wireless network.

Alternatively to a feed mixing cart 40 at a feed delivery site 32, a conveyor belt 48 can also be provided. The grab bucket 22 can then, for example, deposit received feed varieties on the conveyor belt, which, by revolving in the direction of the curved arrow, can deposit this feed in a feed mixing cart 40 . This feed mixing cart 40 can then subsequently bring the feed mixture to the group of animals. Note that in none of the shown feed mixing carts 40, 40" is a mixing device such as an auger shown, though this is advantageously provided.

As can be seen in the figure, the feed variety 31-3 is missing. This can be determined, for example, by the weighing device 23, when this establishes that, in the grabbing operation at the site of the feed variety 31-3, the weight of the received quantity of feed is nil or virtually nil, or at least lower than a desired quantity. Alternatively, in the control system 10, or in a memory connected thereto, which memory, for the purpose of the invention, is deemed to form part of the control system 10, can be specified or stored that a remaining quantity of the feed variety 31-3, which quantity is kept stock of, for example, in the control system or the memory, is less than that quantity of this feed variety which is desired in the feed order. In all these cases, the control system will check whether an alternative feed variety is recorded in the associated fall-back information. For example, the fall-back information for the feed variety 31-3 includes that this can be replaced on a one-to-one basis by the feed variety 31-1. A precondition is that there are still sufficient stocks of the feed variety 31-1, so that the feed order can still be composed with this change. Consequently, the feeding device 1 does not have to stand idle.

Furthermore, in the following fall-back information with respect to the feed variety 31-3 can also be included whether an alarm signal or report message should be generated, and, if so, of what type. Where feed variety 31-3 is a critical feed variety, the control system 10 will generate an alarm signal, which, with the aid of the antenna 11, is sent, for example, to a mobile telephone 61 of the farmer 60. As a result, the farmer can take immediate action. Where the feed variety 31-3 is, for example, only an optional feed variety, or one for which a suitable substitute is provided in the fall-back information, a report message, which, for example, is sent to the computer 51 by the control system 10, can alternatively suffice. Periodically, such as once or twice a day, the farmer 60 or another operator can then fetch the report messages from the computer 51 to see whether an action, other than an immediate action, is necessary.

FIG. 2 shows very schematically a view of an alternative feed mixing cart 40'. This contains an underframe 41', a feed collection hopper 42' and a weighing device 43'. In addition, it comprises an arm 44 bearing a grab bucket 22' and a camera 45. The feed collection hopper 42' has a discharge opening 46, closable with a flap 47, as well as a discharge roller 48.

This feed mixing cart 40 , whereof a mixing auger or other mixing device possibly provided therein is not shown, is a simple example of a self-loading feed mixing cart, which autonomously in the feed kitchen (not shown here, but, for example, the one from FIG. 1) can collect the feed varieties of a feed order. To this end, the cart 40 travels with the aid of navigation means (not further elaborated here, but known in the prior art), for example also the camera 45, to the feed varieties concerned. The grab bucket 22 then takes one or more grabs of the feed variety (varieties) concerned and weighs the associated quantities with the weighing device 43. The composed feed mixture can subsequently, following transfer to a group of animals, be delivered to these animals with the aid of the discharge opening 46 and the discharge roller 48, or some other delivery device such as a conveyor belt. Furthermore, for the control of the feed mixing cart 40 , the control device (not shown here) is responsible. It is here the case that the control system 10 shown in FIG. 1 can be provided on the feed mixing cart 40 , or that this control system 10 dispatches one or more instructions pertaining to the composition of the feed mixtures to a local feed mixing cart control system on the cart 40' (not shown here).

FIG. 3 shows very schematically an example of a table of fall-back information. This fall-back information comprises in the first column, indicated with fv , i.e. feed variety, five feed varieties A to E. In the second column is indicated with ¬fv? (thus actually the Boolean question "NOT(fv) ?") whether, if the feed variety named in the first column is exhausted, an alternative feed variety can be used in a feed mixture. In the table, by stop is meant that there is no alternative feed variety available, and it is thus a question of a critical feed variety, as well as that the composition of the momentary feed mixture should be stopped. By a dash is meant that the associated feed variety from the first column is an optional feed variety, and that the composition of the feed mixture can be continued with omission of this feed variety. In all other cases stated in the table, this feed variety named in the first column can be replaced by the feed variety named in the second column. Note that, in the case of feed variety D, the quantity thereof which is still missing in the momentary feed mixture should be replaced by a 40% larger quantity of the feed variety B.

Finally, in the last column is indicated whether an alarm signal (am) or a report message (rm) should be generated by the control system. It is here the case that an alarm signal is sent directly to an operator and in principle requires immediate action. An immediate action of this type will generally concern the replenishment of the missing feed variety. In the case of a report message, the fact that the feed variety is no longer in stock is less critical, and a message which can be periodically called up, if so desired, by an operator can suffice. This can concern, for example, feed varieties which are only added to make a feed mixture more appetizing, without this containing unique or necessary feed elements. The differentiation between alarm signals and report messages limits the number of unnecessary disturbances to a farmer or other operator, while the total idle period of the feeding device 1 is, at the same time, optimally limited.

The invention claimed is:

1. An automatic and autonomous feeding device, comprising:
    a feed kitchen having a plurality of storage places for different feed varieties and a feed fetching device for fetching feed from the feed kitchen and delivering the feed at a feed delivery site,
    a feed determining device; and
    a control system configured to repeatedly execute a feed composing cycle by being configured to:
        receive or generate a feed order, and
        control the feed fetching device to fetch feed varieties from the feed kitchen according to the feed order in order to compose a feed mixture at the feed delivery site, with a mixing device that receives said feed varieties from the feed fetching device,
        wherein the feed order comprises a list of desired feed varieties and respective quantities to be brought together at the feed delivery site in order to form the feed mixture;
    wherein the feed determining device is configured to determine quantity information of at least one of the feed varieties fetched for the feed order,
    wherein the control system further contains previously entered fall-back information, for the at least one of the feed varieties,
    which fall-back information specifies what action the feeding device should perform, during and/or after execution of a feed composing cycle, if the feed determining device determines that that quantity of this at least one of the feed varieties which is desired in the feed order is greater than the quantity available according to the quantity information, and
    wherein the control system is programmed such that, for the at least one of the feed varieties, the following fall-back information is available for input into the control system:
        a) stopping composing the feed mixture in the mixing device and generation of an alarm signal;
        b) continuing composing the feed mixture in the mixing device, therein replacing the at least one of the feed varieties by at least one alternative feed variety, as well as generation of either b1) an alarm signal, or b2) a callable report message; and
        c) continuing composing the feed mixture in the mixing device, therein omitting the at least one of the feed varieties from the feed order, and generation of a callable report message or an alarm signal.

2. The feeding device as claimed in claim 1, wherein the control system is further configured to update the fall-back information for the at least one of the feed varieties from b) to a) if an available quantity of the at least one alternative feed variety for the at least one of the feed varieties is less than or is equal to the desired quantity of this alternative feed variety.

3. The feeding device as claimed in claim 1, wherein the control system is configured to replace in a feed order a replaceable quantity of the at least one of the feed varieties by an equal quantity of the alternative feed variety.

4. The feeding device as claimed in claim 1, wherein the control system is configured to replace in a feed order a replaceable quantity of the at least one of the feed varieties by a quantity of the alternative feed variety, which quantity is a predetermined function of that quantity of the at least one of the feed varieties which is to be replaced.

5. The feeding device as claimed in claim 1, further comprising the mixing device, wherein the mixing device comprises a feed mixture collection hopper, which is configured to receive therein, at the feed delivery site, the feed mixture to be composed, and the feeding device further comprising a feed delivery device for delivering feed from the feed mixture collection hopper.

6. The feeding device as claimed in claim 5, further comprising a storage site for temporary storage of a feed mixture not yet fully composed according to the associated order.

7. The feeding device as claimed in claim 5, wherein the control system is configured to execute a replacement action if the control system establishes that the feed mixture to be composed is not composable according to the associated feed order and the respective available quantities and fall-back information.

8. The feeding device as claimed in claim 7, wherein the replacement action comprises the delivery of the feed mixture to the storage site, as well as the commencement of composition of a new feed mixture on the basis of a following feed order.

9. The feeding device as claimed in claim 8, wherein the control system is configured to take up the feed mixture delivered to the storage site, and to replenish that feed mixture, according to a new feed order, with at least one quantity of the at least one of the feed varieties or of an alternative feed variety.

10. The feeding device as claimed in claim 7, wherein the replacement action comprises the composition at the feed delivery site of a new feed mixture on the basis of a new feed order and on the basis of the feed mixture present at the feed delivery site.

11. The feeding device as claimed in claim 5, wherein the feed delivery device comprises a delivery opening closable with a movable flap.

12. The feeding device as claimed in claim 5, wherein the feed delivery device comprises a delivery opening closable with a movable flap, the feed delivery device having a motorized rotatable discharge roller configured to deliver feed, by revolution, via the delivery opening.

13. The feeding device as claimed in claim 1, wherein the feed determining device is configured to determine quantity information of each feed variety fetched for the feed order.

* * * * *